United States Patent [19]

Hosoe

[11] 4,057,380

[45] Nov. 8, 1977

[54] TRAY-LIKE CONTAINER AND A METHOD OF AND AN APPARATUS FOR MANUFACTURING THE CONTAINER

[75] Inventor: Masaya Hosoe, Tokyo, Japan

[73] Assignee: Machida Shigyo Co., Ltd., Machida, Japan

[21] Appl. No.: 624,056

[22] Filed: Oct. 20, 1975

Related U.S. Application Data

[62] Division of Ser. No. 565,960, April 7, 1975, Pat. No. 3,973,722.

[30] Foreign Application Priority Data

| | | |
|---|---|---|
| Apr. 16, 1974 | Japan | 49-41687 |
| Jan. 9, 1975 | Japan | 50-4686 |
| Jan. 22, 1975 | Japan | 50-8680 |

[51] Int. Cl.[2] .......... B29C 3/00; B29C 24/00

[52] U.S. Cl. .......... 425/324.1; 425/343; 425/398; 425/DIG. 48

[58] Field of Search .......... 425/394, 398, 383, 412, 425/414, 423, 324 R, DIG. 48, 343; 264/294

[56] References Cited

U.S. PATENT DOCUMENTS

| | | | |
|---|---|---|---|
| 2,296,744 | 9/1942 | Simmons | 425/343 |
| 2,547,331 | 4/1951 | Lent | 425/DIG. 48 |
| 2,760,231 | 8/1956 | Clair | 425/343 |
| 3,203,218 | 8/1965 | Bolt et al. | 425/DIG. 48 |
| 3,256,375 | 6/1966 | Bolelli et al. | 425/DIG. 48 |
| 3,341,895 | 9/1967 | Shelby | 425/DIG. 48 |

*Primary Examiner*—Robert L. Spicer, Jr.
*Attorney, Agent, or Firm*—Kenyon & Kenyon, Reilly, Carr & Chapin

[57] ABSTRACT

A tray-like container of a plastic coated paper blank having a base panel, which has four or more even numbers of side edges, side walls, corner portions, a peripheral portion extending along side walls and corner portions, and a pig-tail like folding line formed in each corner portion of the peripheral portion, of which a flange of the tray-like container is formed. The pig-tail like folding line assists in the outward bending of the peripheral portion so that it forms the outwardly projecting flange of the tray-like container. The outer shape of the tray-like container is forcedly molded by a movable and stationary complementary moulds.

15 Claims, 29 Drawing Figures

| Fig. 1A | Fig. 1B | Fig. 1C |
| --- | --- | --- |

Fig. 10A
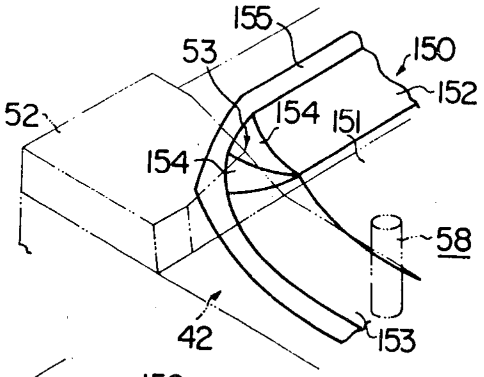
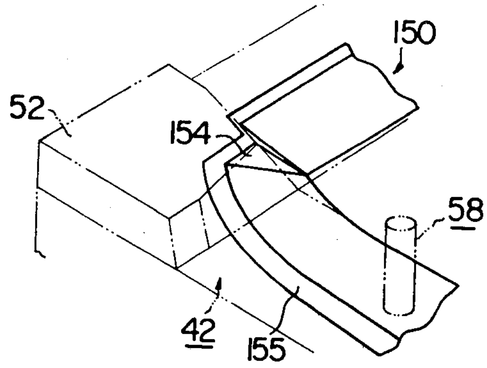
Fig. 10B
Fig. 10C
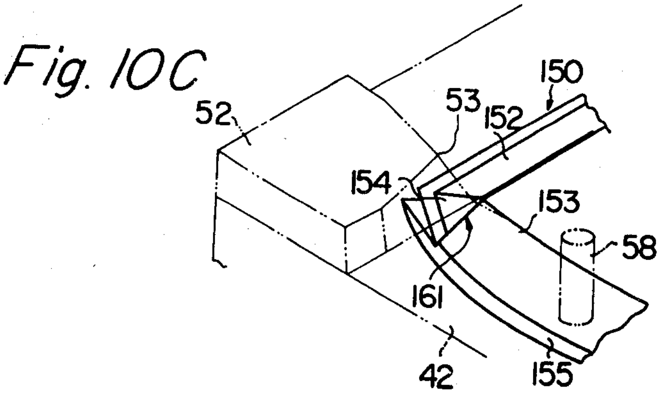

Fig. 19A
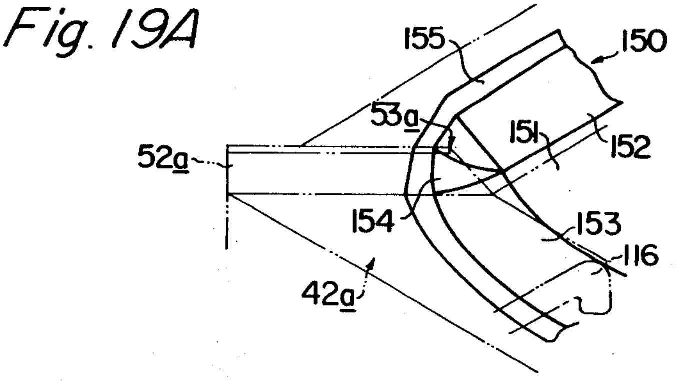
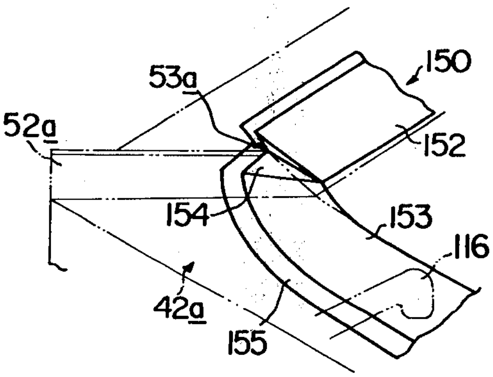
Fig. 19B
Fig. 19C
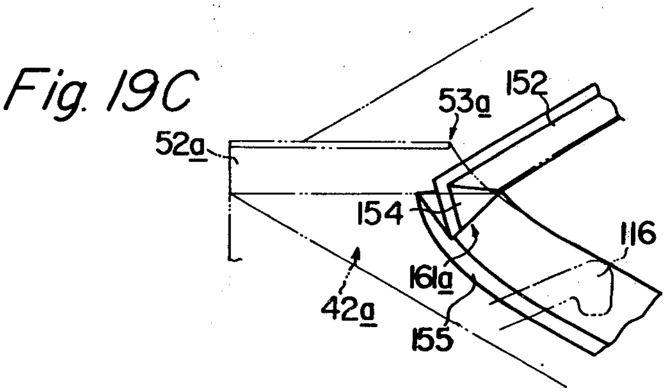

TRAY-LIKE CONTAINER AND A METHOD OF AND AN APPARATUS FOR MANUFACTURING THE CONTAINER

This is a continuation, division, of application Ser. No. 565,960 filed Apr. 7, 1975, now U.S. Pat. No. 3,973,722.

The present invention relates to a tray-like container which is molded from a sheet of container blank and is used for packaging frozen food or processed food. The present invention also relates to a method of and an apparatus for successively manufacturing the containers out of the blanks which are stacked in and fed from a blank magazine for storing many container blanks therein.

A method of manufacturing a tray-like container has been widely known, in which a plastic coated material blank is manually folded so that the general configuration of the container is preformed and, subsequently, the container is finalized into an end product by applying heat and pressure to the folded portions of the container. The employment of the manual folding method is necessary due to the complexity of the folds at each corner portion of the container. Naturally, complete mechanical forming of a tray-like container from a blank material has long been desired so that the above-mentioned manual operation could be eliminated and the containers mass produced. The recent British Pat. No. 1,254,822 proposes a method of and an apparatus for forming a tray-like container from a container blank without manual operation. The container manufactured in accordance with the method and the apparatus of the British Pat. No. 1,254,822 is characterized in that it is provided with, at each corner portion, a support rib projecting toward the outside of the container. This support rib is provided for assisting the outward bending of the lip-like flange of the container and for increasing the physical strength of the container construction. However, the projecting support rib results in the drawback that it is impossible to put one container on top of the other container and, thus, the capability of piling up many containers for the purpose of simultaneously conveying them is lost. Also, in the process of manufacturing the container of the British Pat. No. 1,254,822, a sufficient molding pressure is applied only to the flange portion of each corner of the tray-like container. Thus, there remains, on each corner of the container, a large amount of folded portion which has not undergone the application of a satisfactory molding pressure. As a result, the corners of the tray-like container cannot be completely sealed. Thus, if the tray-like container is used for packaging juicy food, the juice which has oozed out of the food contained in the container cannot be prevented from leaking through the gaps remaining in the folded portions on each corner of the container. Further, the application of insufficient molding pressure on the folded portion on each corner of the container tends to fail to provide sufficient structural rigidness to the corners of the tray-like container.

The primary object of the present invention is, therefore, to provide a tray-like container which eliminates every drawbacks encountered by the containers manufactured in accordance with the method and the apparatus of the above-mentioned British Pat. No. 1,254,822.

Another object of the present invention is to provide a tray-like container which has with a neat and elegant outside configuration, by doing away with all projections or recesses which have conventionally been present when a container is formed out of a sheet of container blank, so that the container has a high merchandising value.

A further object of the present invention is to provide a method of completing the container as set forth in the above objects from a sheet of container blank, and also to provide a molding device for realizing the method.

A still further object of the present invention is to provide an apparatus for successively manufacturing the containers as set forth in the above objects from container blanks fed from a container blank magazine.

In one aspect of the present invention, a tray-like container of a plastic coated paper blank having plural straight folding line components formed therein for defining a central base panel having four or more even numbers of edges, the same numbers of side walls contiguous with the edges of the base panel, the same numbers of corner portions, each corner portion comprising two equal triangular corner panels interconnecting the adjoining side walls and being inwardly bent to form a portion to be folded on either one of said two adjoining side walls, and a peripheral portion extending along the outer edges of the side walls and the corner portions, is characterized in that the paper blank further has a pig-tail like folding line formed in the peripheral portion adjacent to each corner portion so as to extend from the straight folding line component by which the peripheral portion and one of the two triangular corner panels of said each corner portion are partitioned, said pig-tail like folding line assisting the outward bending of said peripheral portion so that it forms an outwardly projecting flange of said tray-like container.

The present invention also consists in a method of forming a tray-like container from a flat container blank which is provided with a central base panel having four or more even numbers of side edges, the corresponding numbers of side walls, each contiguous with the adjacent side edge, and the corresponding numbers of corner portions, each corner portion consisting of two equal triangular corner panels, by molding the container blank through engagement of an upper movable male and an lower stationary female mould complementary to each other, wherein, at the commencement of the engagement of said upper and lower complementary moulds, the container blank is subject to successive folding steps of:

- advancing the container blank positioned above the lower female mould toward an upper surface of said lower mould until said side walls of said container blank rest on the upper surface;
- pressing a selected one of respective adjoining side walls of said container blank against the upper surface of said lower female mould by appropriate weight means while permitting the other of said respective adjoining side walls of the container blank to freely rest on said upper surface of the lower female mould, and;
- forcing the base panel of said container blank into the lower female mould by the upper male mould thereby causing said other of said respective adjoining side walls to upwardly stand from said upper surface of said lower female mould so that the two equal triangular corner panels of each corner portion are urged to be inwardly bent and folded upon themselves and toward said selected one of said respective adjoining side walls, by the help of appropriate abutting means against which each corner portion abuts.

The present invention further consists in a molding device adapted to perform the method as set forth above comprising:

a lower stationary mould having an open mouth that has plural corners, the numbers of which corresponds to those of the corners of the container blank, an inner molding cavity, the shape of which determines the outer shape of the tray-like container and an upper marginal surface portion extending to surround the open mouth;

plural seating means provided on the upper marginal surface portion and adjacent to respective corners of the open mouth of the lower stationary mould, the seating means having abutments, respectively, against which the rear surfaces of the corner portions of the container blank abut at the commencement of the tray-like container molding operation of the molding device;

an upper mould having an outer shape complementary to the shape of the inner molding cavity of the lower mould, the upper mould being vertically movable into and away from the lower stationary mould, and;

weight means for exerting a pre-adjusted press force on to preselected side walls of the container blank so as to press the side walls against the upper marginal surface portion of the lower stationary mould from the time when the side walls of the container blank are urged to rest on the upper marginal surface portion to the time when the whole container blank is drawn into the lower stationary mould, the upper and lower moulds engaging with each other for finalizing molding of the container blank into the tray-like container.

The present invention will readily be understood from the description of the embodiments with reference to the accompanying drawings wherein:

FIGS. 10A through 10C are fragmentary perspective views of one corner of the container blank, which show the process in which the corner of the blank is folded by the molding device of FIGS. 4 and 5;

FIGS. 19A through 19C are fragmentary perspective views similar to FIGS. 10A through 10C, which show the process by which one corner of the container blank is folded by the molding device of FIGS. 16 and 17;

Figures 1, 1A:
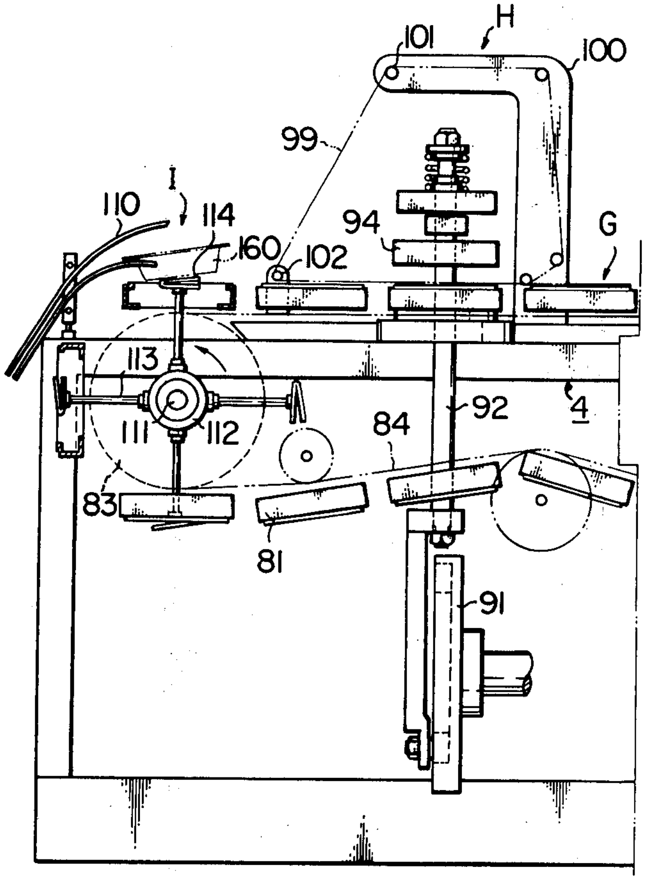
FIG. 1 is a block diagram of the position of the apparatus of FIGS. 1A through 1C.
FIGS. 1A through 1C are a schematic side elevation of an apparatus for manufacturing a tray-like container from a container blank, according to the present invention.
Figure 1B:
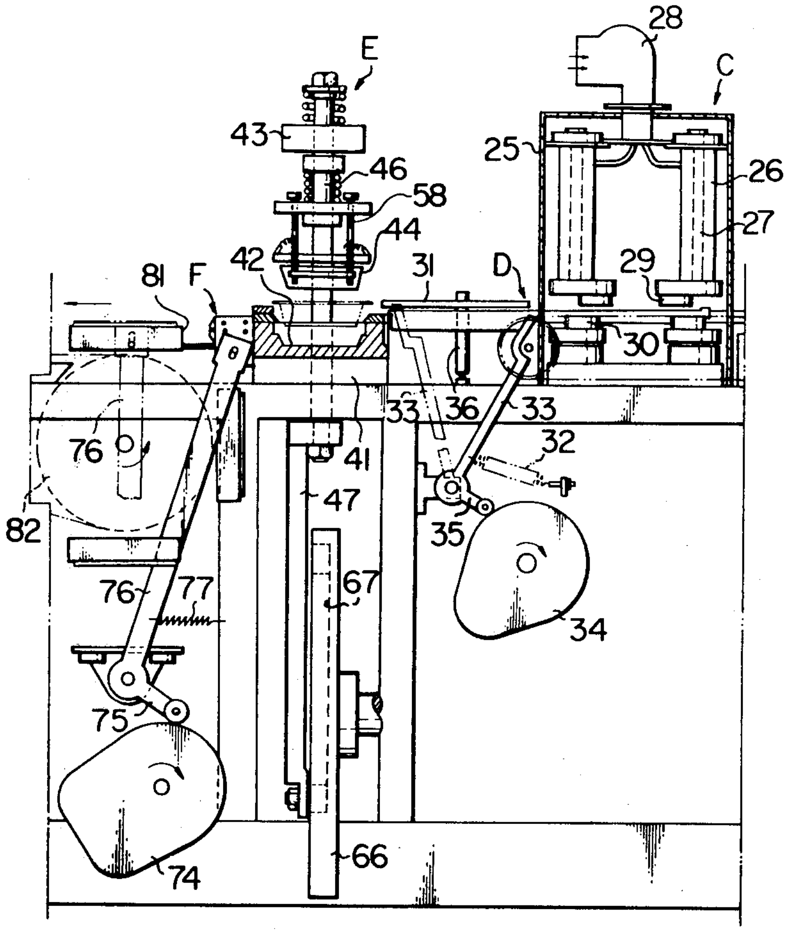
Figure 1C:
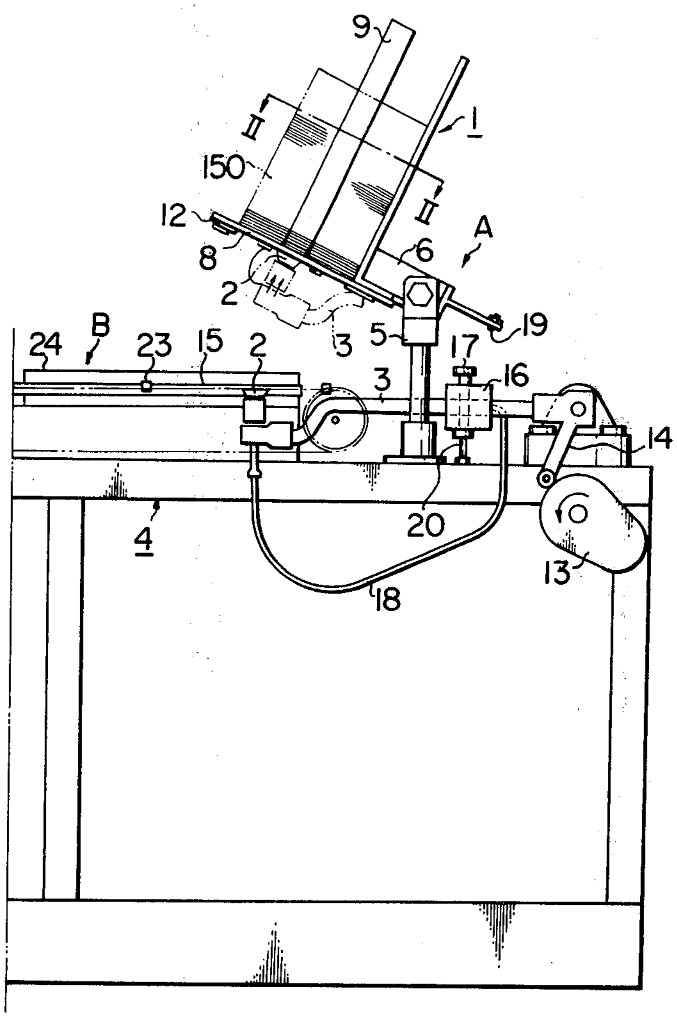
Figure 11:
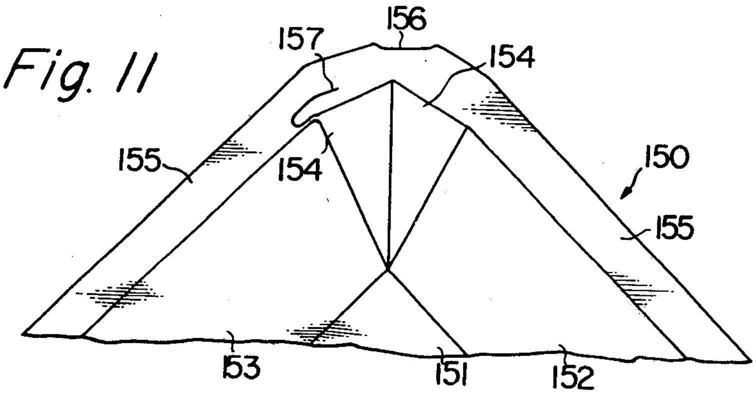
FIG. 11 is a partial plan view of a flat container blank used for forming the tray-like container according to the present invention.
Figure 12:
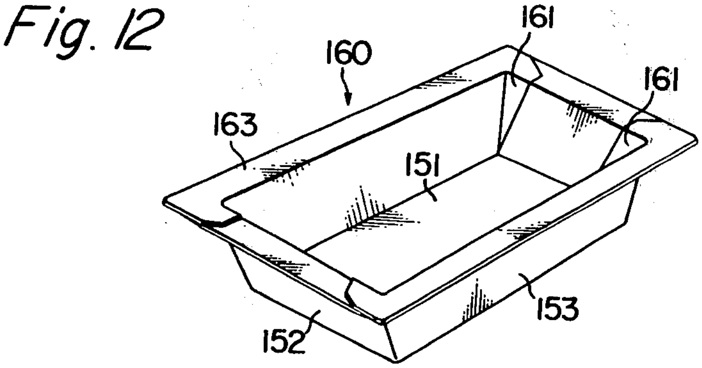
FIG. 12 is a perspective view of an embodiment of the tray-like container according to the present invention.

The apparatus for manufacturing a tray-like container, as shown in FIGS. 1A through 1C, includes therein a blank feeder A for automatically and successively feeding each container blank 150 into the apparatus, a container blank conveyor B for conveying the container blank 150 fed from the feeder A, a heating device C for applying heat to predetermined portion of the blank 150, a sending device D for sending the blank 150 from the heating device C to a subsequent molding stage, a molding device E which presses the heated blank 150 so as to shape it into the configuration of a tray-like container, a shifting device F for shifting the pre-formed container 160 from the molding device E to a transporting device G, a sealing device H for applying a finishing press to the pre-formed container 160 moving on the transporting device G and a discharging device I for discharging the completed tray-like container from the apparatus. The container blank 150 used for forming a tray-like container of the present invention consists of a flat and relatively thick paper material, the opposite surfaces of which are coated by a plastic serving as adhesive upon being heated. The plastic may be polyethylene, polyester, polystyrene, nylon or other thermo plastic. The container blank 150 is provided with four or more even numbers of corner portions which form corresponding numbers of corners of a tray-like container. FIG. 11 fragmentally shows one corner of the blank 150 used for forming a tray-like container having four corners. The corner of the blank 150 is composed of a bottom panel 151, side walls 152 and 153 respectively connected to the bottom panel 151, two triangular corner panels 154 interconnecting the side walls 152 and 153, and a peripheral portion 155 extending along the outer peripheries of the side walls 152 and 153 and the triangular corner panels 154. The above-mentioned bottom panels 151, side walls 152 and 153, triangular corner panels 154 and the peripheral portion 155 are partitioned by appropriate folding lines along which the blank 150 is folded so as to form a tray-like container. A pig-tail like folding line designated by a reference numeral 157 in FIG. 11 is provided for assisting in folding the peripheral portion 155. Reference numeral 156 in FIG. 11 designates a recessed portion which is preferably formed for the purpose of preventing generation of a triple folded portion when the peripheral portion 155 is folded so as to form a lip-like flange 163 of a tray-like container 160, which is referred to hereinafter. The tray-like container 160 shown in FIGS. 1 and 12 is one embodiment of a finished tray-like container formed from the blank 150.

The tray-like container 160 is provided with four folded portions 161, each of which is formed by the two triangular corner panels 154 of the blank 150, and an outwardly projecting flat lip-like flange 163 formed by the peripheral portion 155. One corner of the tray like container 160 is fragmentally shown, at an enlarged scale, in FIG. 13 in which the reference numeral 162 designates a small triangular shaped inward protrusion which is formed at each inner, upper corner of the tray-like container 160, when the lip-like flange 163 is formed by folding the peripheral portion 155 of the blank 150 along the pig tail-like folding line 157.

Figure 2:
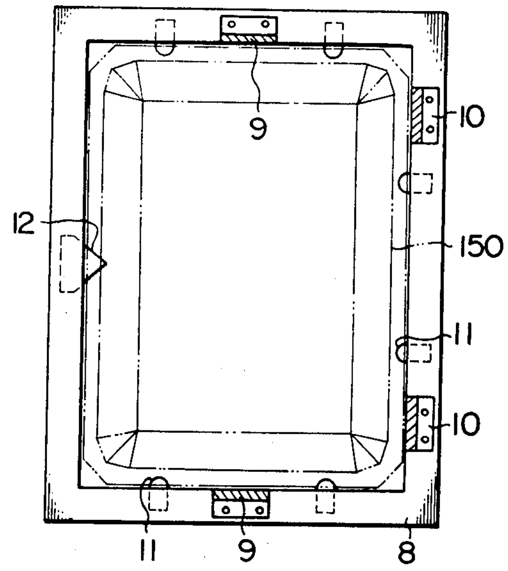
FIG. 2 is an enlarged plan view of a container blank magazine, taken along the line II—II of FIG. 1C.

Referring again to FIG. 1, the blank feeder A comprises a blank magazine 1 for storing a stack of the container blanks 150, and a vacuum rod 3 provided with, at its front end, a vacuum hand 2 which takes the blanks 150 one by one out of the blank magazine 1. The blank magazine 1 is jointed to a stand 5 via a bracket so that the angularity of the blank magazine is capable of being adjusted. The stand 5 is in turn mounted on the top of a base 4. The blank magazine 1, as shown in FIG. 2, is constituted by a framework assembly comprising a bottom frame 8 having an opening 7 through which each blank 150 is able to pass, a pair of side plates 9 standing upwardly from the bottom frame 8, and a pair of rear plates 10 also standing upwardly from the bottom frame 8. The blank magazine 1 is also provided with flexible projections 11 which are made of elastic material, and are projected inward from the opening 7. The projections 11 are fixed to the lower surfaces of the side and rear portions of the bottom frame 8, and operate so as to support the blanks 150 through the opening 7 when a stack of the blanks 150 is stored in the blank magazine 1. A further projection designated by reference numeral 12, is made of rubber and also operates so as to support the blanks 150 in cooperation with the projections 11. The vacuum rod 3, which is located underneath the blank magazine 1 as shown in FIG. 1, is provided with its rear end supported above the base 4. The vacuum rod 3 can be upwardly swung from its initial horizontal position by means of a bell-crank 14 in response to the rotation of a cam plate 13. When the vacuum rod 3 swings upwardly from the initial horizontal position as shown by a solid line in FIG. 1, the vacuum hand 2 is brought from the horizontal position shown by a solid line in FIG. 1 to the upward position shown by a phantom line in FIG. 1. The vacuum hand 2 brought to the upward position operates to take by suction the lowermost blank 150 out of the blank magazine 1 and, subsequently, returns together with the blank 150 to the initial horizontal position. When the vacuum hand 2 together with the vacuum rod 3 return to their initial positions, the suction of the vacuum hand 2 is released so that the blank 150 taken out of the blank magazine 1 is placed on rails 150 of the blank conveyor B. The reference numeral 16 in FIG. 1 designates a valve provided with a valve spool 17 vertically slidable in the valve 16. The valve 16 is connected to the vacuum hand 2 by means of a flexible tube 18, and is so arranged that when the vacuum rod 3 swings to the upward position, the valve spool 17 is pressed down by a pin 19 fixed to the rear most end of the bracket 6, whereby the vacuum hand 2 is connected to a vacuum source (not shown) via the valve 16 and the flexible tube 18. Thus, the vacuum hand 2 can apply suction to the container blank 150 in the blank magazine 1 by the help of the vacuum prevailing in the vacuum hand 2. On the other hand, when the vacuum rod 3 returns to the initial horizontal position, the valve spool 17 is pushed up by a pin 20 fixed to the base 4 so that the connection of the vacuum hand 2 to the vacuum source is interrupted.

Figure 3:
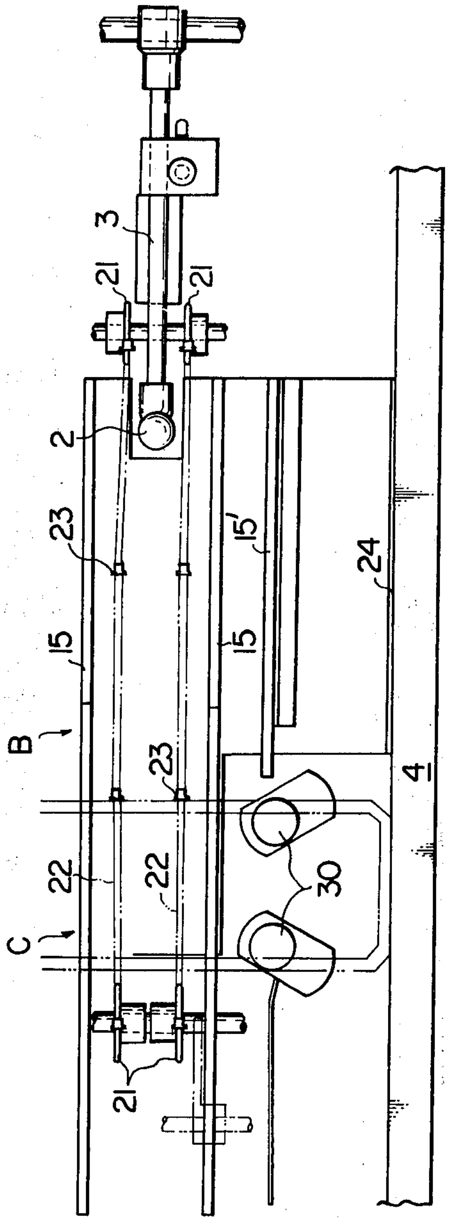
FIG. 3 is an enlarged plan view, in part cut away, of a container blank conveyor incorporated in the apparatus of FIGS. 1A through 1C.

Referring to FIG. 3, the blank conveyor B comprises two parallel rails 15 which are fixedly mounted on the top of the base 4 so as to extend between a blank feeder A and a heating device C, and a pair of endless claims 22 wound around sprocket wheels 21 which are intermittently driven by a drive source (not shown). The lateral distance between the two rails 15 is adjusted so that both rails 15 are able to support, thereon, each container blank 150 in such a manner that the horizontal position of the blank 150 is maintained. The pair of chains 22 are, respectively, provided with pushing attachments 23, each of which has an upward protrusion with respect to the top surface of the rails 15. The upward protrusion of each pushing attachment 23 can serve to push and convey the blank 150 which is placed on the rails 15. The pushing attachments 23 are fixed to each of the pair of chains 22 in such a manner that a predetermined equal distance between adjacent pushing attachments is maintained. The predetermined equal distance between adjacent pushing attachments 23 is selected so as to permit the container blank 150 being conveyed on the rails 15 to be situated between the adjacent pushing attachments 23. A pair of auxiliary rails 15', which are positioned on the lateral outsides of both rails 15, respectively, is provided for assisting the exact conveying of the blanks 150 by the blank conveyor B. The container blanks 150 conveyed by the blank conveyor B subsequently enter into and stop in the heating device C. As shown in FIG. 3, the vacuum hand 2 held at the front end of the vacuum rod 3 is initially located beneath the central position of the two rails 15, and comes up to the upward position through the opening between two rails 15, when the vacuum rod 3 swings upwardly. A pair of lateral plates 24 are provided for preventing the scattering of the container blanks 150 from the blank conveyor B while they are conveyed.

The heading device C shown in FIG. 1 is provided with a box-like housing 25. In the housing 25, a vertical pipe 26 stands at each of the four corners of the housing 25. The upper ends of respective pipes 26 are connected to a common air blower 28 so that the air is supplied into the vertical pipes 26. In the vertical pipes 26, heaters 27, such as electric heaters, are provided for heating the air in the pipes 26. The heated air is ejected from upper nozzles 29 and lower nozzles 30 toward the container blanks 150 which are stationary between the nozzles 29 and 30. It should be noted that the location of the nozzles 29 and 30 are so adjusted that the heated air ejecting from the nozzles 29 and 30 is directed to the portions of each blank 150 which should be heated so as to allow the blank 150 to be folded and formed into a tray-like container. The temperature of the heated air is adjusted to about 200° centigrade so that the plastic coated on the corner panels 154 and side walls 152 and 153 of the container blank 150 may be heated and melted so as to be capable of adhesion. When the heating of the container blank 150 is completed in the heating device C, the blank 150 is delivered from the housing 25 of the heating device C by the action of pushing attachments 23 of the chains 22 of the blank conveyor B. The delivered blank 150 is subsequently sent into the small vertical space between the rail portions 15 located in front of the heating device C and a pair of top rails 31 located above said rail portions 15. It should be noted that the top rails 31 are provided for preventing the blanks 150 from jumping out of the rails 15 during the movement of the blanks 150 toward the subsequent molding device E. The container blank 150 delivered from the heating device C is subsequently sent to the molding device E along the rails 15 when the rear end of the blank 150 is pushed by the sending device D. The sending device D comprises an arm 33 having a lower end rotatable with respect to the base 4. The lower end of the arm 33 is also provided with a bell crank 35, the outer end of which always bears against a rotatable cam plate 34. Further, the arm 33 is always pulled by a compression spring 32 to the position shown by a solid line in FIG. 1. In response to the rotation of the cam plate 34, a predetermined amount of rotation of the arm 33 is actuated against the pulling force of the spring 32 via the bell crank 34. As a result, the arm 33 moves from the position shown by a solid line to the position shown by a phantom line in FIG. 1 and, thus, the upper end of the arm 33 forwards the container blank 150, which is delivered from the heating device C and is placed on the rails 15, to the molding device E. The reference numeral 36 shown in FIG. 1 designates one of a pair of support stands which are fixedly mounted on the top of the base 4 in order to support the top rails 31 so as to exactly keep the small vertical gap between the top rails 31 and the rail portions 15.

Figure 4:
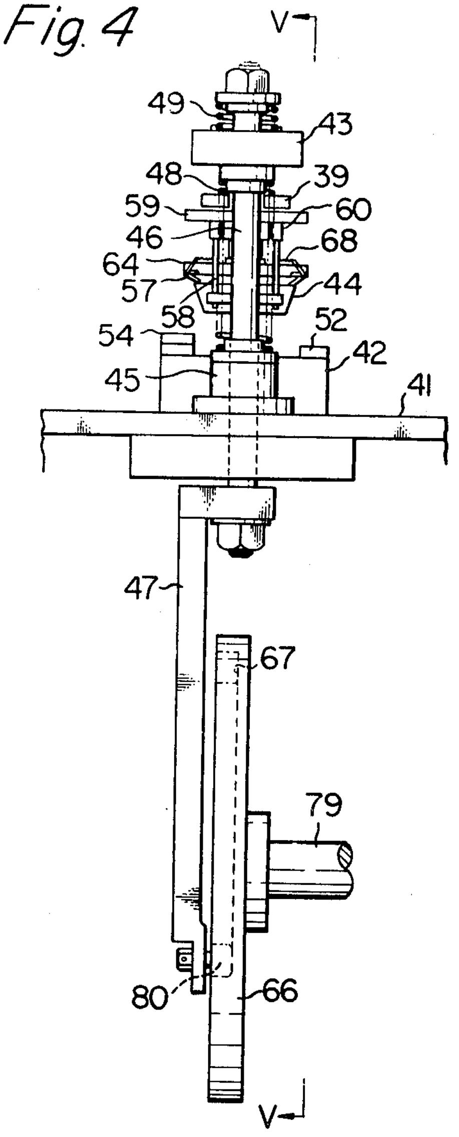
FIG. 4 is an enlarged side elevation of one embodiment of a molding device incorporated in the apparatus of FIGS. 1A through 1C.
Figure 5:
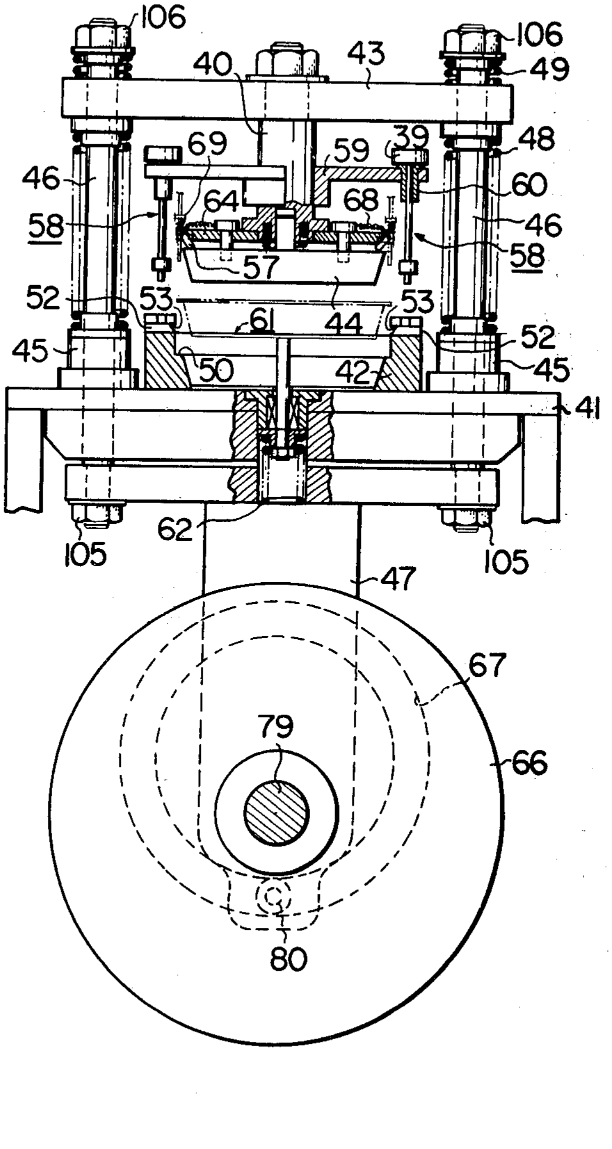
FIG. 5 is a front elevation, in part cross section, of the molding device as viewed along the line V—V of FIG. 4.

The molding device E is provided with a lower mold 42 rigidly mounted on a mount 41 which is fixed to the top face of the base 4, and an upper mold 44 which is supported by a movable body 43 to vertically move toward and away from the lower mold 42. As shown in FIGS. 4 and 5, the movable body 43 is supported at the upper portions of two parallel vertical supporting rods 46 which are vertically and slidably supported by bearings 46 fixed to the mount 41. The movable body 43 is always upwardly pushed by coil springs 48 which are arranged so as to be wound around the supporting rods 46 and are seated against the upper face of the bearings 45. The lower ends of the two supporting rods 46 are provided with screw-nuts 105 threadedly engaged on the rods 46. The upper ends of the two supporting rods 46 are also provided with screw-nuts 106. Coil springs 49, for cushioning purposes, are inserted between the upper face of the movable body 43 and the lower faces of the nuts 49. It should be noted that the spring forces of the springs 48, pushing up the movable body 43 act to keep the contact between the upper faces of the nuts 105 and a mover 47. Thus, the downward movement of the mover 47 retracts, via the contact of the mover 47 and the nuts 105, the two supporting rods 46 against the spring forces of the springs 48. The retraction of the supporting rods 46 through the bearings 45 and the openings of the mount 41 causes, in turn, the downward movement of the movable body 43.

Referring particularly to FIGS. 4 through 7, the lower mold 42 is provided with an upwardly opening inner shape corresponding to the outer configuration of a tray-like container formed by the apparatus according to the embodiment of FIG. 1. In the cavity of the lower mold 42, a step 50 extending along the inner wall of the lower mold 42 is provided for the purpose of pressing the peripheral portions 155 of the container blank 150 upon the pressing of the blank 150 between the upper and lower molds 44 and 42. At each of the four corners of an opening 51 of the lower mold 42, a seat 52 is provided, on which the container blank 150 is placed ahead the starting of the pressing or molding operation of the upper and lower molds 44 and 42. It should be understood from FIGS. 5 and 7 that each of the four seats 52 is provided with a corner point 53 which is outwardly and upwardly kept apart from the corresponding corner of the opening 51 of the lower mold 42. It should be noted that the corner points 53 of the four seats 52 act as abutments against which the rear surfaces of the corner panels 154 of the container blank 150 about while the container blank 150 is subject to the molding operation of the upper and lower molds 44 and 42. That is to say, the corner points 53 of the four seats 52 eventually urge the corner panel 154 of the container blank 150 toward the inside of the lower mold 42 during the molding operation. It should be understood that if desired, the above-mentioned abutment of each seat 52 may be composed of an entire side that outwardly and upwardly slants from the corner of the opening 51 to the corner point 53. The reference numeral 54 in FIGS. 4 and 7 designates guide pieces provided for stopping and positioning the container blank 150 with respect to the lower mold 42 when said blank 150 is fed from the heating device C of FIG. 1. Therefore, the guide pieces 54 are fixed to only the two seats 52 which are located at the front portion of the lower mold 42 with respect to the feeding direction of the container blank 150. Also, the inner corners of both guide pieces 54 are shaped so as to correspond to the shapes of the front corners of the container blank 150.

Figure 6:
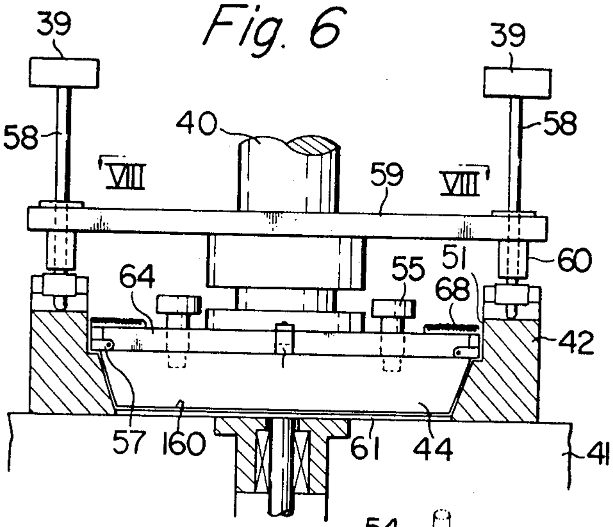
FIG. 6 is a schematic cross section of the molding device of FIGS. 4 and 5, which shows one molding process wherein a container blank is pressed between the upper and lower molds so as to be shaped in a configuration of a tray-like container.
Figure 7:
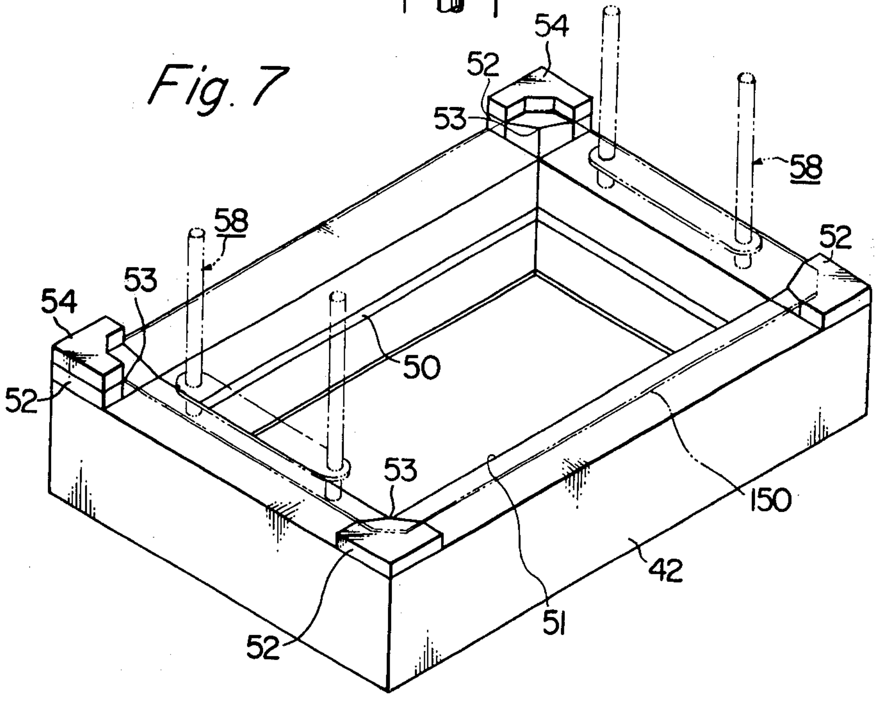
FIG. 7 is an enlarged perspective view of the lower mold of the molding device of FIGS. 4 and 5.
Figure 8:
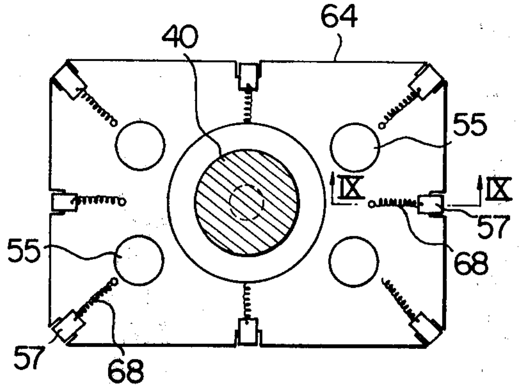
FIG. 8 is a plan view as viewed along the line VIII—VIII of FIG. 6.
Figure 9:
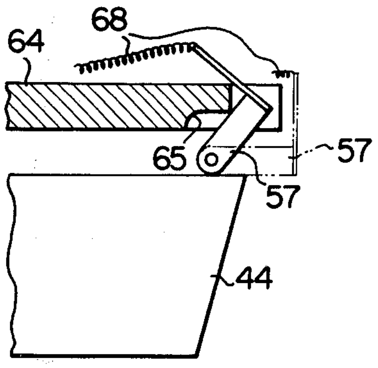
FIG. 9 is an enlarged fragmentary sectional view taken along the line IX—IX of FIG. 8.

Referring particularly to FIG. 5, the upper mold 44, the outer shape of which corresponds to the inner shape of a tray-like container to be molded, is connected to a holding plate 64 by means of plural guide stud 55 which are provided with round heads, respectively. The holding plate 64 is connected to the movable body 43 by means of a shaft 40. When the upper mold 44 is not operated and is moved upwardly away from the lower mold 42, the upper mold 44 is kept apart from the holding plate 64 by the interposition of a spring 56, which is provided with the upper end inserted into a lower annular groove of the shaft 40 and the lower end bearing against the upper surface of the upper mold 42. However, the holding plate 64 and the upper mold 44 suspended from the holding plate 64 can be brought into contact with each other against the spring force of the spring 56 by the guide of the guide studs 55. Between the holding plate 64 and the upper mold 44, there are provided a plurality of link presses 57, the lower ends of which are pivotably connected to the periphery of the upper surface of the upper mold 44. As shown in FIGS. 5, 8 and 9, the upper end of each link press 57 is retracted by a spring 68 toward the center of the holding plate 64. The link presses 57 are pivoted by the holding plate 64 from the position shown by a solid line to the position shown by a phantom line in FIG. 9 when the holding plate 64 comes into contact with the upper surface of the upper mold 44. That is to say, when the upper mold 44 is operated so as to engage with the lower mold 42, as shown in FIG. 6, the pivoted link presses 57 take the position laterally projecting from the upper mold 44 so that the projecting ends of the link presses 57 press and bend the peripheral portion 155 of the container blank 150 against the step 50 of the lower mold 42. In this embodiment of the molding device E, the number of the link presses 57 is selected to be eight so that they are disposed at the four corners and four central portions of the four sides of the holding plate 64, as shown in FIG. 8. The most important function of the link presses 57 is to press and bend the peripheral portion 155 of the container blank 150 toward the upper surface of the upper mold 44, in response to the downwardly contacting motion of the holding plate 64. Thus, simple press members, such as suitably bent plate springs appropriately disposed between the holding plate 64 and the upper surface of the upper mold 44 may well be substituted for the link presses 57 and perform the same function as said link presses 57. In FIGS. 5 and 9, the reference numeral 65 designates a cave which is recessed from the periphery of the lower surface of the holding plate 64 so as to allow the lower end of the link press 57 to enter into the cave 65 when the link press is pivoted to the horizontal position shown by a solid line. In FIG. 5, the shaft 40 is provided with an arm 59 fixed to the vertical central portion of the shaft 40. From this arm 59, a pair of press members 58 are hanging via sleeves 60. Both press members 58 are disposed laterally at both sides of the upper mold 44, and each press member 58 is comprised of two rod members slidable in the sleeves 60 and two weights 39 fixed to the top of the two rod members, respectively. As the arm 59 is tightly fixed to the shaft 40, the press members 58 move toward and away from the lower mold 42 in response to the movement of the movable body 43 and the upper mold 44. Thus, when the press members 58 move down and rest on the upper surface of the lower mold 42, the two press members 58 press the two lateral sides of the conainer blank 150 against the upper surface of the lower mold 42, as shown in FIG. 7. It should be noted that since the press members 58 are slidable within the sleeves 60, the pressing of the above-mentioned two lateral sides of the container blank 150 against the upper surface of the lower mold 42 is exhibited solely by the weight of the two press members 58. Thus, with the advance of the molding operation of the upper and lower molds 44 and 42, the container blank 150 is pressed into the lower mold 42 by the strong pressing force exhibited by the upper mold 44, and as a result the lateral sides of the container blank 150 are also drawn into the lower mold 42 against the pressing force due to the above-mentioned weight of the press members 58. In the foregoing description, the two press members 58 are disposed so as to press the two lateral sides of the blank 150. However, the disposition of the two press members 58 may be moved so that they press the front and rear sides of the container blank 150, if required. Also, an appropriate flat plate may be employed for pressing the sides of the container blank 150 instead of the described two rods of each press member 58. In FIG. 5, a support 61, for supporting the container blank 150 or the molded tray-like container, is composed of a flat plate, which is shaped so as to correspond to the shape of a bottom opening 63 of the lower mold 42, and a vertical rod, the upper end of which is connected to the bottom surface of the flat plate. The support 61 is so arranged that it is always pushed upward by a spring 62. Thus, when the upper mold 44 is disengaged from the lower mold 42, the top surface of the support 61 is the same level as the upper surface of the lower mold 42. On the other hand, when the upper mold 44 is engaged with the lower mold 42, the flat plate of the support 61 is seated in the bottom opening 63 of the lower mold 42 against the spring force of the spring 62. In FIGS. 4 and 5, a rotary cam 66 is fixedly mounted on a horizontally disposed main shaft 79 which is driven by a drive source (not shown). The rotary cam 66 is provided with an annular cam groove 67 formed in one round surface of the cam 66 so as to be eccentric with respect to the rotating axis of the rotary cam 66. In the cam groove 67, a turnable pin follower 80, one end of which is fixed to the lower most end of the mover 47, is engaged so that the rotation of the rotary cam 66 causes the reciprocal vertical movement of the mover 47 via the engagement of the pin follower 80 and the cam groove 67. The amount of the upward or downward movement of the mover 47 is initially adjusted by selecting the amount of the eccentricity of the cam groove 67 with respect to the rotating axis of the rotary cam 66, so that during the molding operation of the molding device E, exact engagement and disengagement of the upper and lower molds 44 and 42 is performed. The reference numeral 69 in FIG. 5 designates rod-like droppers for use in removing the molded tray-like container from the upper mold 44 in the case where the upper mold 44 upwardly moves away from the lower mold 42 while accompanying the molded tray-like container after completion of the molding operation. The droppers 69 are held by an appropriate support stand (not shown) standing erect on the base 41, via respective spring members for permitting the slight vertical movements of the droppers 69.

The molding operation of the above-mentioned molding device E proceeds as follows after the completion of positioning of the container blank 150 onto the seats 52 of the lower mold 42.

Figure 13:
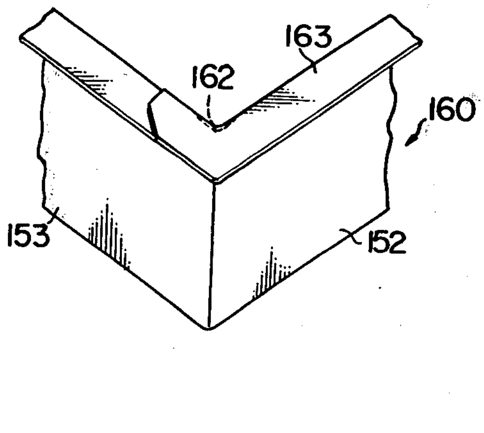
FIG. 13 is an enlarged fragmentary perspective view of the tray-like container as shown in FIG. 12.

The downward movement of the upper mold 44 from its upwardly retracted position, which movement is activated by the downward movement of the movable body 43, pushes the bottom panel 151 of the container blank 150 thereby pressing down the blank 150 into the lower mold 42. When the bottom panel 151 of the blank 150 is pressed down to the upper surface of the support 61, the lateral side walls 153 of the blank 150 rest on the upper surface of the lower mold 42, and are pressed against the press members 58 which has moved down along with the upper mold 44. This state of the container blank 150 is fragmentarily shown in schematic form in FIG. 10A. From this state, the continuation of the downward movement of the upper mold 44 forceably presses the bottom panel 151 of the container blank 150 into the lower mold 42. As a result, the front and rear side walls 152 of the container blank 150 begin to erect from the upper surface of the lower mold 42, since there are no means provided for pressing the front and rear side walls 152 against the upper surface of the lower mold 42. The erecting action of the front and rear side walls 152 subsequently causes an inward folding of the two triangular corner panels 154, defined between adjacent side walls 152 and 153, by the aid of the abutment 53 of the seat 52. It should be noted from FIG. 10B that at the start of the inward folding of the two corner panels 154, they firstly bend toward the inside of the lower molding 42 along the folding line separating the two corner panels 154 from one another. Of course the same folding action of the two triangular corner panels 154 occurs at every corner of the container blank 150. The bottom panel 151 of the blank 150 is further pressed into the lower mold 42 by the upper mold 44. Thus, each of the side walls 152 and 153 are also gradually drawn into the lower mold 42, although the lateral side walls 153 are still pressed by the press members 58 against the upper surface of the lower mold 42. Consequently, the corner panels 154, which have continued to be inwardly folded, are eventually folded on the lateral side walls 153 due to the complete erection of the front and rear side walls 152. This process is shown in FIG. 10C. Thereafter, a further continually downward movement of the upper mold 44 draws the entire container blank 150 into the lower mold 42 against the resistance of the pressing force exerted by the press members 58. The downward movement of the upper mold 44 continues until the upper mold 44 is completely engaged in the lower mold 42 whereby the bottom panel 151 of the blank 150 together with the support 61 reach the bottom opening 63 of the lower mold 42. When the upper mold 44 is completely engaged in the lower mold 42, the corner panels 154 folded on the lateral side walls 153 are subject to a strong pressure acting between the engaged upper and lower molds 44 and 42. As a result, the corner panels 154 and the lateral side walls 153 are tightly joined together by the heated plastic coating on the surfaces of the container blank 150, so that the folded portions 161 shown in FIG. 12 are shaped. After the engagement of the upper and lower molds 44 and 42, the movable body 43 successively moves down so as to push down the holding plate 64. As a result, the holding plate 64 comes into contact with the upper surface of the upper mold 44, against the spring force of the spring 56, thereby causing the downwardly pivotal motion of the link presses 57 against the retraction of the spring 68. The pivotal motion of the link presses 57 gradually bend the peripheral portion 155 of the container blank 150 toward the step 50 of the lower mold 42. Finally, when the downward stroke of the movable body 43 comes to an end, the holding plate 64 together with the link presses 57 press the entire peripheral portion 155 of the container blank 150 against the step 50, so that the configuration of the tray-like container 160 with the lip-like flange 163 is molded from the blank 150. When the peripheral portion 155 of the blank 150 is formed into the lip-like flange 163, the portion 155 adjacent to the corner panels 154 are joined together with that adjacent to the lateral side walls 153 by the heated adhesive plastic. Further, when the peripheral portion 155 of the blank 150 is formed into the lip-like flange 163, contraction of the blank material occurs on only the four inner corners of the tray-like container 160 so that the quite small protrusions 162 hereinbefore described with reference to FIG. 13 are produced. After the molding of the tray-like container 160, the upper mold 44 is moved upwardly by the upward stroke of the movable body 43 so as to be disengaged from the lower mold 42. Thus, the support 61 is lifted by the spring force of the spring 62 to its upper most position where the upper surface of the support 61 is even with the upper surface of the lower mold 42. When the support 61 reaches the upper most position, the molded tray-like container 160 is dropped from the upper mold 44 onto the support 61 by the help of the droppers 69. The tray-like container 160 on the support 61 is then shifted by the shifting device E to the transporter G.

Figure 14A:
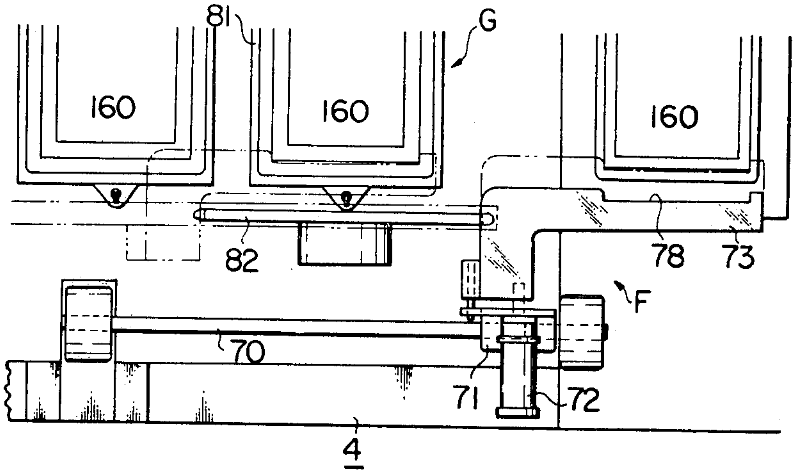
FIG. 14A is a fragmentary top plan view of a transporter incorporated in the apparatus of FIG. 1A through FIG. 1C.
Figure 14B:
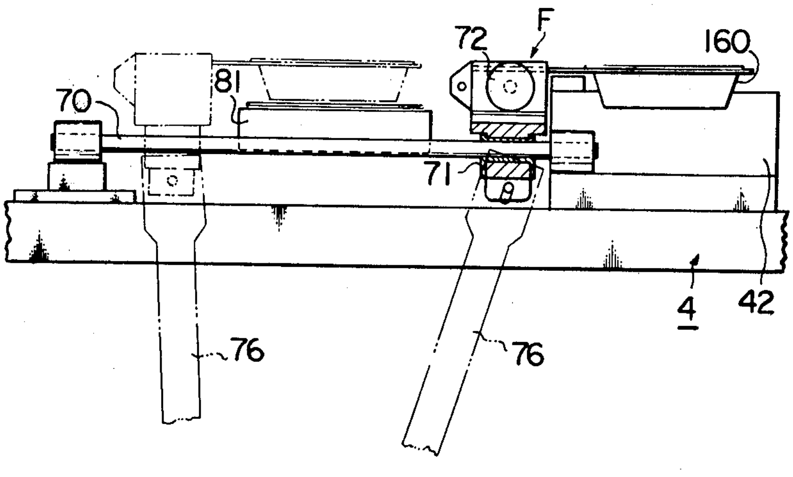
FIG. 14B is a fragmentary side view of the transporter of FIG. 14A.

Referring now to FIGS. 1, 14A and 14B, the shifting device F is composed of a pair of horizontal guide rods 70 which are stationarily disposed on both lateral sides of the base 4, two sliders 71, each being slidable on each guide rod 70, via suitable bearings, in the direction parallel to the longitudinal direction of the apparatus, electro-motive cylinders 72 mounted on both sliders 71, and a pair of grasping members 73, each being provided with a recessed hand 78 for catching a tray-like container when the shifting device F shifts the tray-like container from the molding device E to the transporter G. Each grasping member 73 is connected to the corresponding electro-motive cylinder 72. Thus, the grasping member can be forwarded from the position shown by a solid line in FIG. 14A to the position shown by a phantom line when the electro-motive cylinder 72 is energized. The sliders 71 are driven so as to slide on the guide rods 70 by a pair of arm bars 76, the upper ends of which are pivotably connected to the sliders 71. The arm bars 76 perform a predetermined amount of reciprocal turning motion about a common horizontal axis shown in FIG. 1. That is to say, the counter clockwise turning motion of the arm bars 76 in FIG. 1 is actuated by the clockwise rotation of a cam plate 74 via a bell crank 75 while the clockwise turning motion of the arm bars 76 in FIG. 1 is actuated by a spring 77 bridging between the arm bars 76 and the base 4.

The operation of the shifting device E is as follows. When the electro-motive cylinders 72 are energized and come into operation, the pair of grasping members 73 approach one another so that the recessed hands 78 of the grasping members 73 grasp the tray-like container 160 on the support 61. Subsequently, the turning motion of the arm bars 76 is actuated by the cam plate 74 so that the pair of sliders 71 slide on the guide rods 70 from the position adjacent to the molding device E to the position adjacent to the transporter G. When the sliders 71 reach the position adjacent to the transporter G, the electro-motive cylinders 72 are de-energized, so that the grasping members 76 release the tray-like container 160 thereby placing said container in a framework 81 of the transporter G. Thus, the shifting of the molded tray-like container 160 from the molding device E to the transporter G is completed. When the shifting of the molded tray-like container 160 is completed, the grasping members 73 together with the sliders 71 return to their initial positions due to the retracting force of the spring 77.

As is shown in FIG. 1, the transporter G comprises a plurality of frameworks 81 attached to a pair of laterally parallel chains 84 which are driven in the counter clockwise direction in FIG. 1 by a sprocket wheel 82 disposed adjacent to the molding device E and another sprocket wheel 83 disposed adjacent to the discharging device I. Each framework 81 of the transporter G is provided with a mouth 85 for receiving the tray-like container 160, and a pair of side lugs by means of which the framework 81 is attached to the chains 84. The transporter G is so operated that it intermittently transports the tray-like containers 160 in each framework 81 toward the sealing device H of the subsequent stage in response to the intermittent rotation of the sprockets 82 and 83.

Figure 15:
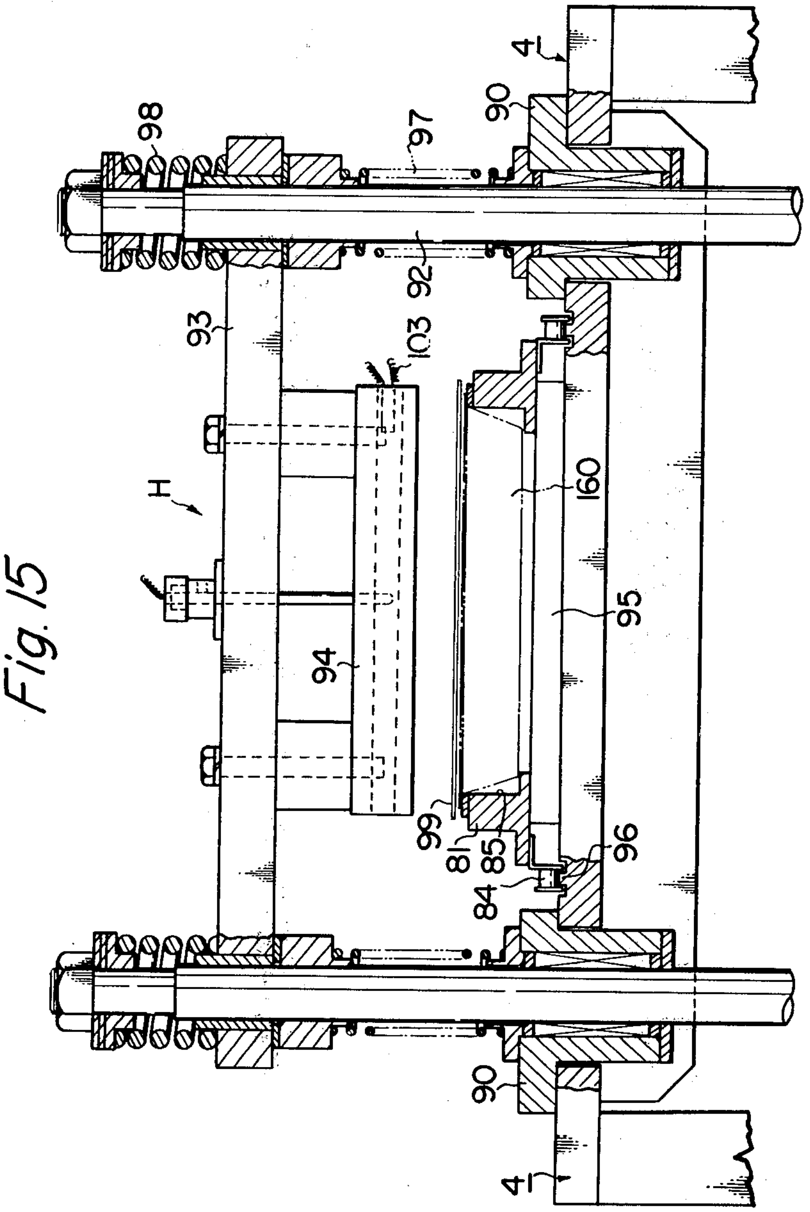
FIG. 15 is a partly sectioned fragmentary front view of a sealing device incorporated in the apparatus of FIG. 1A through FIG. 1C.
Figure 16:
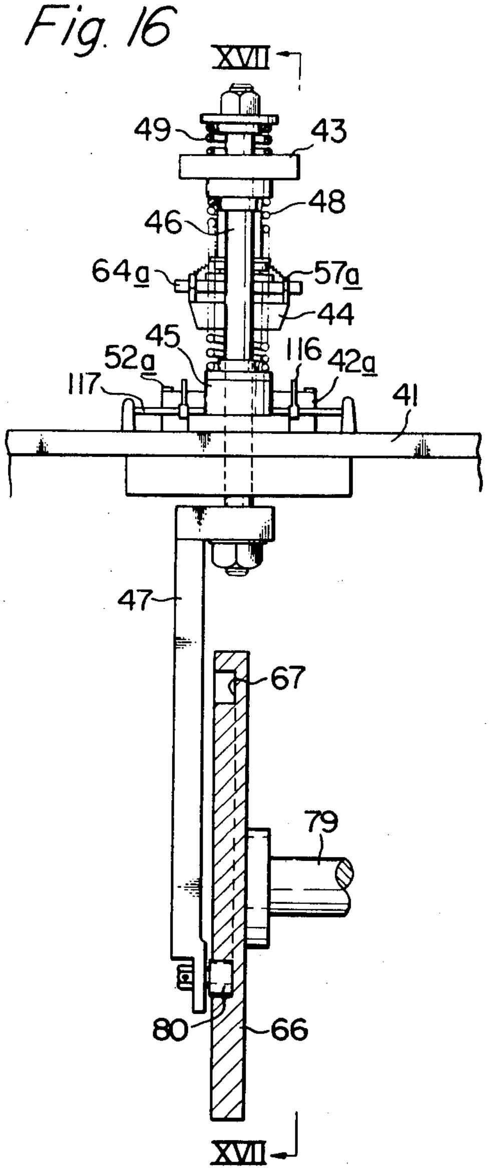
FIG. 16 is an enlarged side elevation of another embodiment of molding device to be incorporated in the apparatus of FIGS. 1A through 1C.

Referring to FIGS. 1 and 15, the sealing device H is provided with a heating plate 94 having therein a heating coil 103 to heat the plate 94 upon being excited. The heating plate 94 is fixed to a movable body 93 which is fixedly mounted on upper parts of two vertically movable support rods 92. The support rods 92 are slidably supported by bearings 90 secured to the base 4, respectively, and the vertical movements of the two support rods 92 are caused by the rotation of a rotary cam 91 similar to the afore-mentioned rotary cam 67 so that the vertical movements are always in perfect unison with one another. The sealing device H is also provided with a flat rest plate 95 which is rigidly mounted on the base 4 so that the frameworks 81 of the transporter G, which have transported the molded tray-like containers, rest on the rest plate 95 during the sealing operation of the device H. At both lateral sides of the rest plate 95, rails 96 along which the chains 84 with the frameworks 81 run, are arranged. The rails 96 are formed in one part with the base 4. However, they may be separate members from the base 4. Springs 97 positioned around the vertical support rods 92 always serve to lift the movable body 93, while springs 98 are provided as buffering means for the movable body 93. The sealing device H is further provided with a pair of inverted L-shaped stands 100 (in FIG. 1 only one stand can be seen) having a plurality of guide rolls 101 rotatably mounted thereon, and a front guide roll 102 which is located in front of the pair of stands 100. The guide rolls 101 and 102 carry an endless release film 99 so that the film 99 is capable of running around the guide rolls. The running of the release film 99 is so guided that the tray-like container 160 which is received in the framework 81 resting on the rest plate 95, is covered by the film 99 reaching underneath the heating plate 94 of the sealing device. The release film 99 covering the upper surface of the tray-like container 160 serves to prevent the container 160 from attaching to the lower surface of the heating plate 94 when the sealing operation is performed. The film 99 is provided with an appropriate lateral width sufficient for covering the entire upper surface of the tray-like container 160, and is preferably made of tetrafluoroethylene cloth material. When each tray-like container 160 is transported onto the rest plate 95 of the sealing device H by the intermittent operation of the framework 81 of the transporting device G, the movable body 93 moves downward so that the heating plate 94 fixed to the body 93 applies heat and pressure to the lip-like flange 163 of the tray-like container 160 positioned above the rest plate 95, via the above-mentioned release film 99 whereby the tight binding of the four folded portions 161 and the complete bending of the lip-like flange 163 are attained. The application of heat and pressure by the heating plate 94 is referred to as the sealing operation of the sealing device H throughout the description of the specification. After the sealing operation, the heating plate 94 moves upward together with the movable body 93. The upward movement of the heating plate 94 does not cause any upward movement of the sealed tray-like container 160 because of the interposition of the release film 99. Further, any possible attaching of the sealed container 160 to the release film 99 is easily released by the running of the release film 99, as explained hereinafter. The sealed tray-like container is transported from the rest plate 95 of the sealing device H toward the discharging device I (FIG. 1), while in the sealing device H, the next tray-like container 160 to be sealed, is positioned underneath the heating plate 94. During the transporting of the tray-like container 160 to the discharging device I, the release film 99 attached to the lip-like flange 163 of the container 160 moves with the container 160 toward the guide roll 102. When the film 99 reaches the guide roll 102, its moving direction is suddenly changed by the guide roll 102 so that the film 99 runs upwardly and rearwardly from the guide roll 102. Thus, the release film 99 and the tray-like container 160 are naturally separated from one another.

When the tray-like container 160 is carried to the discharging device I, it is removed from the framework 81 of the transporter G by the device I, and is sent into a discharge path 110. In the discharge path 110, the lip-like flange 163 of the tray-like container 160 is guided by plate members as shown in FIG. 1 which define the discharge path 110 descending toward an outlet of the apparatus.

The discharging device I is composed of a plurality of branch arms 113 radially fixed to a pair of ring members 112 which are mounted on a shaft 111 of the sprocket wheels 83, and a plurality of pushing elements 114 which are respectively attached to the outermost ends of the branch arms 113. Each pushing element 114 is made of elastic plate-like material which is bent into a U-shape. When each pushing element 114 comes adjacent to the framework 81 which reaches the entrance of the discharge path 110, the upper leg portion of the U-shaped pushing element 114 serves to push up the tray-like container 160 in the framework 81 in response to the rotation of the sprocket wheel 83, since the upper leg portion of the U-shaped pushing element 114 is outwardly expanded, as shown in FIG. 1. In the embodiment of FIG. 1, four pushing elements 114 are equiangularly arranged around the sprocket wheel 83. Thus, each intermittent rotation of the sprocket wheel 83 through ninety degrees brings one pushing element 114 to the uppermost position where the pushing element 114 serves to remove the tray-like container 160 from the framework 81 and to send the container 160 into the discharge path 110.

The consecutive operations exhibited by the apparatus of FIG. 1 will now be described.

A number of the container blanks 150, which were cut out of a raw material sheet and are provided with plastic coatings applied onto both surfaces of each blank, are stacked in the blank magazine 1 prior to the starting of the operation of the apparatus. When a drive source (not shown in the drawings) is operated, the vacuum rod 3 is upwardly swung from the initial horizontal position so that the vacuum hand 2 takes the lowermost blank 150 out of the blank magazine 1 and places it on the rails 15 of the blank conveyor B. The intermittently operating blank conveyor B, subsequently, conveys the container blank 150 into the heating device C in which the container blank 150 is kept stationary for a while so that heat is applied to the portions of the container blank 150 that are required to be heated for the purpose of obtaining the adhesive condition of the plastic coatings applied to said portions. Subsequently, the container blank 150 is sent to the molding device E by the action of the sending device D. In the molding device E, the blank 150 is molded into the configuration of the tray-like container 160. The tray-like container 160 molded by the molding device E is shifted to the transporter G by the action of the shifting device F. The transporter G, which intermittently comes into operation, transports the tray-like container 160 to the sealing device I in which the sealing operation is performed so that the tray-like container 160 is finished into an end product. The end product tray-like container 160 is subsequently conveyed by the transporter G to the discharging device I by which the end product is automatically sent into the discharging path 110 which leads to the outlet of the apparatus of FIG. 1.

It should be noted that the finished product of the tray-like container 160 has the configuration as shown in FIG. 12. However, the horizontally projecting flange 163 of the tray-like container 160 may be shaped in a downwardly or upwardly curved flange by selecting appropriate shapes of the upper and lower molds 44 and 42. If required, it will be possible to completely eleminate any flange portion from a tray-like container.

Figure 20:
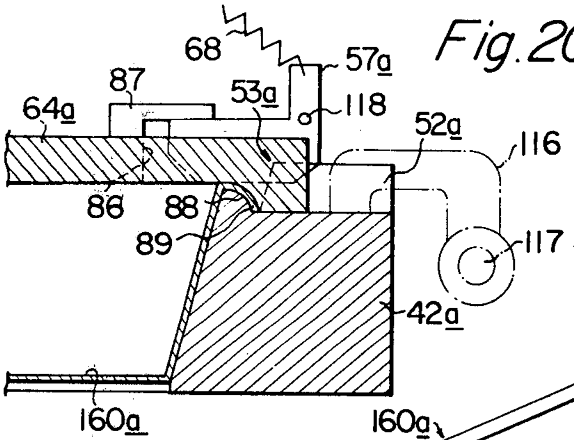
FIG. 20 is an enlarged fragmentary sectional view of the molding device of FIGS. 16 and 17, which shows one molding process where the container blank is pressed between the upper and lower mold.
Figure 21:
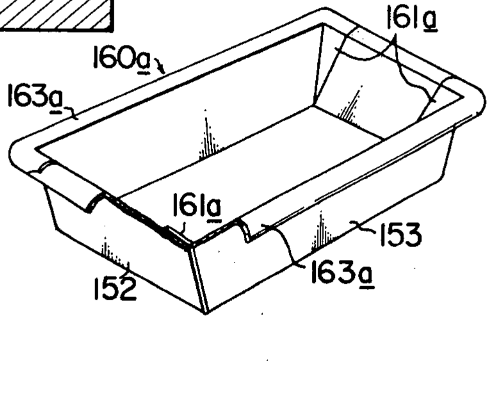
FIG. 21 is a perspective view of another embodiment of the tray-like container according to the present invention.

A description will now be provided of the manufacturing of another embodiment of a tray-like container that is provided with a curved flange as shown in FIG. 21, with reference to FIG. 16 through FIG. 20C. In FIGS. 16 through 21, the same elements as those shown in FIGS. 4 through 13 are designated by the same reference numerals, except that the similar elements are designated by attaching a suffix "*a*" to the numerals of the elements shown in FIGS. 4 through 13.

Referring to FIGS. 16 through 19, the lower mold **42*a* is provided with an upwardly opening inner shape corresponding to the desired outer configuration of a tray-like container 160*a***.

The lower mold **42*a* is also provided with an upward curved protrusion 88 extending along the upper inner edges of the lower mold 42*a*. The curved protrusion 88 is formed as one part with the other part of the lower mold 42*a*, and is provided for molding a later-described downwardly curved flange 163*a* of a tray-like container 160*a*. On the upper surface of the lower mold 42*a*, four seats 52*a*, each of which has the shape of an upwardly projecting vertical wall, are provided so as to be located at the four corners of the lower mold 42*a*. Inner top corners of the four seats 52*a* that are identified by the reference numeral 53*a* are situated outward with respect to the corners of the opening of the lower mold 42*a*. Each of the inner top corners 53*a* is provided for serving as an abutment against which the rear surfaces of the corner panels 154 of the container blank 150 abuts during the molding operation. Thus, the corner panels 154** can be prevented from being outwardly folded.

The upper mold 44, the outer shape of which corresponds to the inner shape of the tray-like container **160*a*, is connected to a holding plate 64*a* by means of plural guide studs 55. The holding plate 64*a* is fixed to the lowermost end of the shaft 40 which is suspended from the central part of the removable body 43. The spring 56 interposed between the holding plate 64*a* and the upper mold 44 keeps separation between the plate 64*a* and the upper mold 44 while the upper mold 44 is moved away from the lower mold 42*a*. Between the holding plate 64*a* and the upper mold 44, there is also provided a plurality of link presses 57*a* whose function is the same as that of the link presses 57 as shown in FIG. 8 and FIG. 9. The link presses 57*a* are pivotal about pins 118 which are appropriately supported by the holding plate 64*a* and, moreover, the link presses are always retracted by the springs 68, the inner ends of which are attached to a metal flange 38 fitted to the lower part of the shaft 40. Recesses 86 are formed in the peripheral part of the holding plate 64*a* so that the link presses 57*a* are received in the recesses 86 when the presses 57*a* pivot about the pins 118 against the retraction of the springs 68. This pivotal motion of the link presses 57*a* is stopped by pawl-like projections 87 of the holding plate 64*a*. Peripheral part 89 of the lower surface of the holding plate 64*a* is recessed so as to have a shape complementary to the shape of the curved protrusion 88 of the lower mold 42*a*. The recessed peripheral part 89 and the curved protrusion 88 cooperated so as to form the peripheral portion 155 of the container blank 150 into the downwardly curved flange 163*a* of the tray-like container 160*a*. The advantage of the curved flange 163*a* over the horizontally projecting flange 163 of the tray-like container 160 is that the physical strength of the flange 163a is stronger than the flange 163. It should be understood that, if required from the point of the physical strength of the flange of a tray-like container, the complementary shape of the recessed peripheral part 89 and the curved protrusion 88 may be altered into, for example, an angled shape. Pawl like press members 116 are pivotably mounted on horizontal shafts 117, and the innermost ends of the press members 116 come into contact with the upper surfaces of both lateral sides of the lower mold 42*a* when the press members 116 are inwardly pivoted toward the inside of the lower press 42*a*. The inwardly pivotal motion of the press members 116 occurs in association with the downward movement of the above-mentioned movable body 43 so that the pivoted innermost ends of the press members 116 press the lateral sides of the container blank 150 against the upper surface of the lower mold 42*a* by the weights of the members 116. Thus, the weights of the press members 116 are so adjusted that when the upper mold 44 further urges the blank 150 into the lower mold 42*a*, the lateral sides of the container blank 150, that are pressed by the press members 116, can be properly entrained into the inside of the lower mold 42*a*. The press members 116 return to their outwardly pivoted initial position in response to the upward movement of the movable body 43 after the molding operation of the lower and upper molds 42*a* and 44**.

When the container blank 150 is positioned on the seats **52*a* of the lower mold 42*a* of the molding device E, the rotary cam 66 starts to rotate in response to the starting of the rotation of the main shaft 79, so that the mover 47 is downwardly retracted. The downward retraction of the mover 47 causes a downward movement of both supporting rods 46 accompanying the movable body 43. The downward movement of the movable body 43 causes, in turn, the downward movement of the upper mold 44 toward the lower mold 42*a*, via the shaft 40 and the holding plate 64*a*. Thus, the container blank 150 on the seats 52*a* is pressed by the upper mold 44 into the lower mold 42*a***.

FIGS. 19A through 19C illustrate the process in which the container blank 150 is successively pressed and molded by both molds **42*a* and 44. As shown in FIG. 19A, when the blank 150 together with the support 61 is pressed down a slight amount from the top of the seats 52*a*, the lateral side walls 153 of the blank 150 reach the upper surface of the lower mold 42*a*. Therefore, the press members 116 which have pivoted inwardly in response to the downward movement of the movable body 43, press said lateral side walls 153 against the upper surface of the lower mold 42*a*. The upper mold 44 further presses the bottom panel 151 of the blank 150 into the lower mold 42*a*. Thus, as shown in FIG. 19B, the front and rear side walls 152 begin to rise from the upper surface of the lower mold 42*a*, since the blank 150 which is larger than the opening area of the lower mold 42$a$ must be forceably pressed into the lower mold 42$a$ and since the side walls 152 are free from such restraint as the pressing forces acting on the lateral side walls 153 by means of the press members 116. As a result, the corner panels 154 between both side walls 152 and 153 naturally become bent. However, as the abutments 53$a$ prevent the outward bending of the corner panels 154, they are bent inwardly and eventually folded toward the lateral side walls 153 as shown in FIG. 19C. Thereafter, the bottom panel 151 of the container blank 150 is further pressed into the lower mold 42$a$ by the downward advance of the upper mold 44. Thus, every side wall 152 and 153 is also gradually drawn into the lower mold 42, althrough only the lateral side walls 153 are still pressed by the press members 116 against the upper surface of the lower mold 42$a$. Consequently, the corner panels 154, which have continued to be folded, are finally folded onto the lateral side walls 153 by the action of the completely erecting front and rear side walls 152. A further continuous downward movement of the upper mold 44 draws the entire container blank 150 into the lower mold 42$a$ against the resistance of the pressing force of the press members 116. The downward movement of the upper mold 44 continues until it is completely engaged in the lower mold 42$a$. When the engagement of the upper and lower molds 42$a$ and 44 is attained, the corner panels 154 folded onto the lateral side walls 153 are subject to a strong pressure acting between the engaged upper and lower molds. As a result, the corner panels 154 and the lateral side walls 153 are tightly joined together by the heated adhesive plastic coating the surfaces of the container blank 150. After the engagement of the upper and lower molds 44 and 42$a$, the movable body 43 successively moves down so as to push down the holding plate 64$a$ until the pushed plate 64$a$ comes in contact with the upper surface of the upper mold 44. During the moving of the holding plate 64$a$, the link presses 57$a$ inwardly pivot about the pins 118 against the spring forces of the springs 68, thereby outwardly bending the peripheral portion 155 of the container blank 150. The bent peripheral portion 155 of the container blank 150 subsequently undergoes the pressure exerted by the recessed peripheral part 89 of the holding plate 64$a$ and the curve protrusion 88 of the lower mold 42$a$. FIG. 20 illustrates the state where the peripheral portion 155 is pressed between said recessed part 89 and curved protrusion 88 so that the downwardly curved flange 163$a$ of the tray-like container 160**$a$ is shaped.

Figure 17:
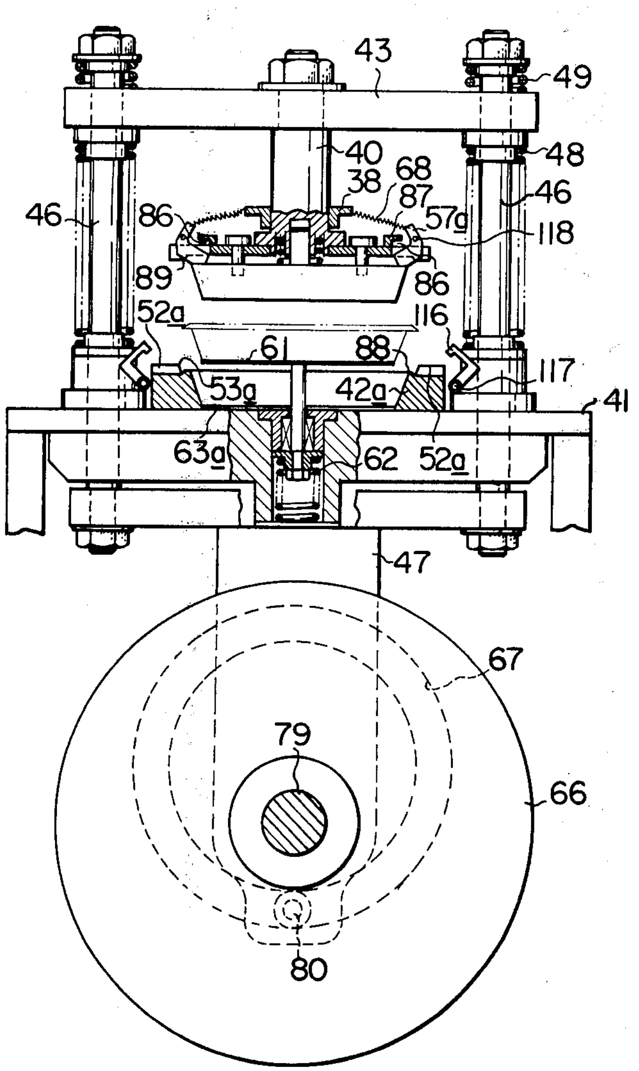
FIG. 17 is a front elevation, in part cross section, of the molding device as viewed along the line XVII—XVII of FIG. 16.
Figure 18:
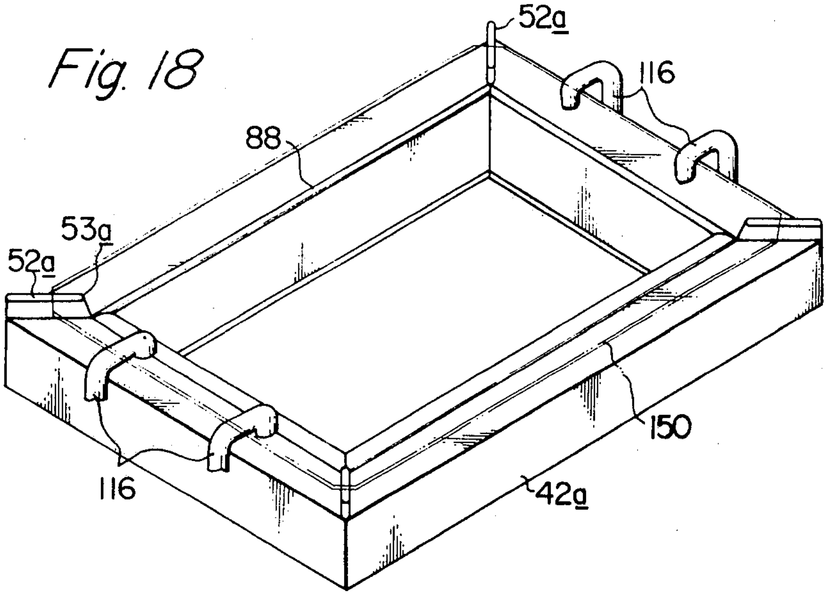
FIG. 18 is an enlarged perspective view of the lower mold of the molding device of FIGS. 16 and 17.

The molded tray-like container 160$a$ is then removed from the lower mold 42$a$ according to the same process as the case of the previously desribed tray-like container 160, and is placed on the support 61, as shown in FIG. 17. The molded tray-like container 160$a$ is subsequently shifted by the shifting device F to the transporter G. When the tray-like container 160$a$ is brought into the sealing device H, it undergoes the sealing action exerted by the device H. It should, however, be understood that the design of the sealing device H must be chosen so as to be fit for the sealing of the downwardly curved flange 163$a$ of the tray-like container.

As the construction of the curved flange 163$a$ in firmer than that of the horizontally projecting flat flange 163 of the tray-like container 160 as shown in FIG. 12, the tray-like container 160$a$ will be able to endure a greater external force during usage of the container 160$a$ compared with the tray-like container 160.

From the foregoing description of the two embodiments, it will be understood that the present invention provides the following advantages.

i. As the plastic coated container blanks 150 stacked in the blank magazine are consecutively and automatically molded into the tray-like container 160 of 160$a$, mass production of the containers can be attained.

ii. Since the corner panels 154 of the container blank 150 are folded toward the inside of a tray-like container 160 or 160$a$ and since any projection or recess does not appear at the outside of the tray-like container, the merchandising value from the point of the outside view of the tray-like container is very high.

iii. Since the corner panels 154 of the container blank 150, which are folded onto the inner side walls of the tray-like container 160 or 160$a$, are tightly joined together with the inner side walls through the strong pressure of the molding device, leakage of fluid oozed out of the foods contained in the container can be prevented with certainty.

iv. Since the tray-like container 160 or 160$a$ is not provided with any vertical ribs on the outside of the container, it is opssible to put one tray-like container on top of another container whereby the piling of many containers for the purpose of simultaneously conveying the tray-like containers is attained.

What is claimed is:

1. A molding press adapted to fold a flat paper blank into a tray-like container, the blank having a polygonal base panel with an even number of sides and corners, a continuous border around the base panel, and respective sets of three fold lines radiating from each corner of the polygonal base panel across the border to divide the border into side wall portions, contiguous with the respective sides of the base panel, and corner portions consisting of pairs of contiguous identical triangular panels that form respective gussets connecting adjacent side wall portions of the tray blank, the molding press comprising:

a female mold member having a molding cavity with an open mouth formed with an even number of corners corresponding to corners of a polygonal tray-like container to be formed in said molding cavity, a marginal surface portion surrounding the open mouth of the molding cavity, and seating means located adjacent to respective corners of the open mouth of the molding cavity and adapted to support a flat paper tray blank prior to folding, each seating means having an abutment spaced above the marginal surface and adapted to contact a corresponding corner of such a tray blank at approximately the fold line between the respective pair of triangular panels;

a male mold member having an outer shape complementary to the molding cavity of the female mold member;

means for moving said male member into and away from said female mold member; and pressing means adapted to exert a force against only alternate ones of the side wall portions of such a tray blank when the blank is supported on the seating means, to press such alternate side wall portions against said marginal surface portion while leaving the other side wall portions adjacent to said alternate ones of the side wall portions unrestrained when the blank is forced into the molding cavity by moving the male mold member into the female mold members, whereby each contiguous pair of corner panels is folded inwardly on the common fold line between the panels by contact with the corresponding abutment, and said other side wall portions are folded upwardly as the blank enters the molding cavity so as to fold the contiguous triangular panels against the adjacent ones of the side wall portions when the mold members are fully engaged.

2. A molding press in accordance with claim 1, wherein the female mold member is positioned underneath the male mold member, and the pressing means comprises weight means adapted to exert a predetermined constant pressing force on the alternate ones of the side wall portions of a tray blank against the marginal surface portion of the female mold member.

3. A molding press in accordance with claim 1 wherein the pressing means comprises a plurality of rods slidably connected to the male mold member, the axes of the rods extending substantially parallel to the direction of movement of the male mold member, and ends of the rods being adapted to come into pressing contact with corresponding alternate ones of the side wall portions of a tray blank supported on the seating means of the female mold member as the male mold member is moved into the female mold member.

4. A molding press in accordance with claim 1, wherein the female mold member is positioned underneath the male mold member, and the pressing means comprises:

a plurality of vertical rods connected to the male mold member for limited sliding movement with respect thereto, the rods having lower ends adapted to contact corresponding alternate ones of the side wall portions of a tray blank supported on the seating means of the female mold member as the mold member approaches the female mold member and weights mounted on the rods and adapted to exert constant pressing forces on the alternate ones of the side wall portions of such a tray blank as the male mold member enters into the female mold member.

5. A molding press in accordance with claim 1, wherein the pressing means comprises a plurality of press members pivotally mounted exteriorly of the marginal surface portion of the female mold member, at least one of the press members being located adjacent to each section of the marginal surface that corresponds to a respective alternate one of the side wall portions of a tray-like container to be folded from a flat paper blank in said press, each press member having a finger-like contact member and being pivotable from a first position in which the contact member is rotated away from the marginal surface portion to a second position in which the contact member is urged toward the marginal surface portion with a predetermined pressing force.

6. A molding press in accordance with claim 1 wherein the female mold member is positioned underneath the male mold member, and the pressing member comprises a plurality of press members pivotally mounted exteriorly of the marginal surface portion of the female mold member, at least one of the press members being located adjacent to each section of the marginal surface that corresponds to a respective one of the side wall portions of a tray-like container to be folded from a flat paper blank in said press, each press member having a finger-like contact member and being pivotable from a first position in which the contact member is rotated away from the marginal surface portion to a second position in which the contact member is urged by its own weight toward the marginal surface portion with a predetermined constant pressing force.

7. A molding press in accordance with claim 1 comprising a flat plate mounted in the molding cavity of the female mold member, the flat plate being movable from a first position coplanar with the marginal surface surrounding the open mouth of the molding cavity to a second position at the bottom of the molding cavity by movement of the male mold member into full engagement with the female mold member and biasing means for urging the flat plate toward the first position, whereby the flat plate is adapted to support a flat paper blank during the forming of a tray-like container therefrom and to eject the container from the female mold member as the male mold member is withdrawn.

8. A molding press adapted to fold a flat paper blank into a tray-like container, the blank having a polygonal base panel with an even number of sides and corners, a continuous border around the base panel, a peripheral band around the continuous border, and respective sets of three fold lines radiating from each corner of the polygonal base panel across the border to the peripheral band to divide the border into side wall portions, contiguous with the respective sides of the base panel, and corner portions consisting of pairs of contiguous identical triangular panels that form respective gussets connecting adjacent side wall portions of the tray blank, the molding press comprising:

a female mold member having an open mouthed molding cavity formed with an even number of side walls and corners corresponding to side walls and corners of a polygonal tray-like container to be formed in said molding cavity, a marginal surface portion surrounding the open mouth of the molding cavity, a stepped surface extending along the inside of the molding cavity parallel to the plane of the marginal surface portion, and seating means located adjacent to respective corners of the open mouth of the molding cavity and adapted to support a flat paper tray blank prior to folding, each seating means having an abutment spaced above the marginal surface and adapted to contact a corresponding corner portion of such a tray blank at approximately the fold line between the respective pair of triangular panels;

a male mold member having an outer shape complementary to the side walls of the molding cavity of the female mold member;

a holding plate;

means connecting the male mold member to the holding plate for limited relative movement therebetween;

means for moving the holding plate toward and away from the female mold member between a first position at which the male mold member is spaced from the female member and a second position in which the male mold member is fully engaged with the molding cavity of the female mold member;

pressing means adapted to exert a force against only alternate ones of the side wall portions of a tray blank when the blank is supported on the seating means, to press such alternate side wall portions against said marginal surface portion while leaving the other side wall portions adjacent to said alternate ones of the side wall portions unrestrained when the blank is forced into the molding cavity by movement of the holding plate from the first position toward the second position, whereby each contiguous pair of corner panels will be folded inwardly on the common fold line between the panels by contact with the corresponding abutment, and said other side wall portions will be folded upwardly as the blank enters the molding cavity so as to fold the contiguous triangular panels against the adjacent alternate ones of the side wall portions when the mold members are fully engaged at the second position of the holding plate; and means on said holding plate cooperating with said stepped surface of the molding cavity of the female mold member when the holding plate in said second position for forming the peripheral band of the tray blank into a lip-like flange around the periphery of the side wall portions of the folded tray-like container.

9. A molding press in accordance with claim 8, wherein the press further comprises a plurality of resiliently-biased pivotable finger-like members arranged between the holding plate and the male mold member so that said finger-like members are brought into pivoting contact with said stepped surface inside the molding cavity upon relative movement of the holding plate toward the male mold member after the male mold member has become fully engaged with the molding cavity of the female mold member, said pivotable finger-like members being adapted to initiate bending of a peripheral band of a tray blank at the commencement of forming the peripheral band into a lip-like flange by cooperation of the holding plate and the stepped surface.

10. A molding press adapted to fold a flat paper blank into a tray-like container, the blank having a polygonal base panel with an even number of sides and corners, a continuous border around the base panel, a peripheral band around the continuous border, and respective sets of three fold lines radiating from each corner of the polygonal base panel across the border to the band to divide the border into side wall portions, contiguous with the respective sides of the base panel, and corner portions consisting of pairs of contiguous identical triangular panels that form respective gussets connecting adjacent side wall portions of the tray blank, the molding press comprising:

a female mold member having an open mouthed molding cavity formed with an even number of side walls and corners corresponding to side walls and corners of a polygonal tray-like container to be formed in said molding cavity, a lip, upwardly convex in cross section, extending along the edge of the open mouth of the molding cavity, a flat marginal surface portion surrounding the lip, and seating means located adjacent to respective corners of the open mouth of the molding cavity and adapted to support a flat paper tray blank prior to folding, each seating means having an abutment spaced above the marginal surface and adapted to contact a corresponding corner portion of such a tray blank at approximately the fold line between the respective pair of triangular panels;

a male mold member having an outer shape complementary to the side walls of the molding cavity of the female mold member;

a holding plate;

means connecting the male mold member to the holding plate for limited relative movement therebetween;

means for moving the holding plate toward and away from the female mold member between a first position at which the male mold member is spaced from the female mold member and a second position at which the male mold member is fully engaged with the molding cavity of the female mold member;

pressing means adapted to exert a force against only alternate ones of the side wall portions of a tray blank when the blank is supported on the seating means, to press such alternate side wall portions against said marginal surface portion while leaving the other side wall portions adjacent to said alternate ones of the side wall portions unrestrained when the blank is forced into the molding cavity by movement of the holding plate from the first position toward the second position, whereby each contiguous pair of corner panels will be folded inwardly on the common fold line between the panels by contact with the corresponding abutment, and said other side wall portions will be folded upwardly as the blank enters the molding cavity so as to fold the contiguous triangular panels against the adjacent alternate ones of the side wall portions when the mold members are fully engaged at the second position of the holding plate; and an upwardly concave recess on said holding plate cooperating with the lip around the mouth of the molding cavity of the female mold member when the holding plate is in said second position for forming the peripheral band of the tray blank into a lip-like flange around the periphery of the side wall portions of the folded tray-like container, the cross-sectional shape of the flange corresponding to the cross section of the lip on the female mold member.

11. A molding press in accordance with claim 10, wherein the press further comprises a plurality of resiliently-biased pivotable finger-like members arranged between the holding plate and the male mold member so that said finger-like members are brought into pivoting contact with said lip around the mouth of the molding cavity upon relative movement of the holding plate toward the male mold member after the male mold member has become fully engaged with the molding cavity of the female mold member, said pivotable finger-like members being adapted to initiate bending of a peripheral band of a tray blank at the commencement of forming the perpheral band into a lip-like flange by cooperation of the recess in the holding plate and the lip of the molding cavity.

12. A molding press adapted to fold a flat paper blank into a tray-like container, the blank having a polygonal base panel with an even number of sides and corners, a continuous border around the base panel, and respective sets of three fold lines radiating from each corner of the polygonal base panel across the border, the fold lines dividing the border into side wall portions contiguous with the respective sides of the base panel, and corner portions consisting of pairs of contiguous identical triangular panels that form respective gussets connecting adjacent side wall portions of the tray blank, the molding press comprising:

a female mold member having an open-mouthed molding cavity having an even number of side walls and corners corresponding to sidewalls and corners of a tray-like container to be formed in the molding cavity, a marginal surface portion surrounding the open mouth of the molding cavity, and seating means formed integrally on said marginal surface portion adjacent to respective corners of the open mouth of the molding cavity and adapted to support a flat paper tray blank prior to folding, each seating means having an abutment spaced above the marginal surface portion and adapted to contact a corresponding corner of such a tray blank at approximately the fold line between the respective pair of triangular panels;

a male mold member having an outer shape complementary to the molding cavity of the female mold member;

means for moving said male member into and away from said female mold member; and pressing means adapted to exert a force against only alternate ones of the side wall portions of such a tray blank when the blank is supported on the seating means, to press such alternate side wall portions against said marginal surface portion while leaving the other side wall portions adjacent to said alternate ones of the side wall portions unrestrained when the blank is forced into the molding cavity by moving the male mold member into the female mold members, whereby each contiguous pair of corner panels is folded inwardly on the common fold line between the panels by contact with the corresponding abutment, and said other side wall portions are folded upwardly as the blank enters the molding cavity so as to fold the contiguous triangular panels against the adjacent ones of the side wall portions when the mold members are fully engaged.

13. A molding press in accordance with claim 12, wherein each seating means has flat surface spaced above the marginal surface portion, and the abutment comprises a corner point of said flat surfaces, the corner point being spaced outwardly from the adjacent corner of the molding cavity.

14. A molding press in accordance with claim 12, wherein each seating means is formed as an upstanding wall, and the abutment comprises an inner top corner of said wall spaced above the marginal surface and outwardly from the adjacent corner of the molding cavity.

15. A method of forming a tray-like container from a flat container blank which is provided with a central base panel having four or more even numbers of side edges, the corresponding numbers of side walls, each contiguous with the adjacent side edge, and the corresponding numbers of corner portions, each corner portion consisting of two equal triangular corner panels, by molding the container blank through engagement of an upper movable male and lower stationary female mould complementary to each other, wherein at the commencement of the engagement of said upper and lower complementary moulds, the container blank is subject to successive folding steps of:

advancing the container blank positioned above the lower female mould toward an upper surface of said lower mould until said side walls of said container blank rest on the upper surface;

pressing a selected one of respective adjoining side walls of said container blank against the upper surface of said lower female mould by appropriate weight means while permitting the other of said respective adjoining side walls of the container blank to freely rest on said upper surface of the lower female mould, and;

forcing the base panel of said container blank into the lower female mould by the upper male mould thereby causing said other of said respective adjoining side walls to upwardly stand from said upper surface of said lower female mould so that the two equal triangular corner panels of each corner portion are urged to be inwardly bent and folded upon themselves and toward said selected one of said respective adjoining side walls, by the help of appropriate abutting means against which each corner portion abuts.

* * * * *

UNITED STATES PATENT AND TRADEMARK OFFICE

CERTIFICATE OF CORRECTION

PATENT NO. : 4,057,380

DATED : November 8, 1977

INVENTOR(S) : Masaya Hosoe

It is certified that error appears in the above-identified patent and that said Letters Patent are hereby corrected as shown below:

Col. 1, line 63, change "drawbacks" to --drawback--.

Col. 2, line 43, change "an" to --a--.

Col. 9, lines 47-48, correct spelling of "container".

Col. 15, line 53, change "removable" to --movable--.

Col. 16, line 8, change "cooperated" to --cooperate--.

Col. 17, line 53, correct spelling of "described".

Col. 18, line 27, correct spelling of "possible".

In the Claims:

Col. 20, line 15, after "surface" insert --portion--.

Col. 22, line 57, correct spelling of "peripheral".

UNITED STATES PATENT AND TRADEMARK OFFICE
CERTIFICATE OF CORRECTION

PATENT NO. : 4,057,380
DATED : November 8, 1977
INVENTOR(S) : Masaya Hosoe

It is certified that error appears in the above-identified patent and that said Letters Patent are hereby corrected as shown below:

In the Claims:

Col. 23, line 43, after "has" insert --a--.

Signed and Sealed this

*Twenty-third* Day of *May 1978*

[SEAL]

*Attest:*

RUTH C. MASON
*Attesting Officer*

LUTRELLE F. PARKER
*Acting Commissioner of Patents and Trademarks*